(12) United States Patent
Matsuda et al.

(10) Patent No.: US 9,709,032 B2
(45) Date of Patent: Jul. 18, 2017

(54) AIRFLOW GENERATION DEVICE AND WIND POWER GENERATION SYSTEM

(71) Applicant: Kabushiki Kaisha Toshiba, Minato-ku (JP)

(72) Inventors: Hisashi Matsuda, Shinagawa-ku (JP); Kenichi Yamazaki, Yokohama (JP); Motofumi Tanaka, Yokohama (JP); Naohiko Shimura, Atsugi (JP); Masahiro Asayama, Yokohama (JP); Toshiki Osako, Kawasaki (JP)

(73) Assignee: KABUSHIKI KAISHA TOSHIBA, Minato-ku (JP)

(*) Notice: Subject to any disclaimer, the term of this patent is extended or adjusted under 35 U.S.C. 154(b) by 617 days.

(21) Appl. No.: 14/210,875

(22) Filed: Mar. 14, 2014

(65) Prior Publication Data

US 2014/0286789 A1   Sep. 25, 2014

(30) Foreign Application Priority Data

Mar. 21, 2013   (JP) ................... 2013-058015

(51) Int. Cl.
*F03D 7/02* (2006.01)
(52) U.S. Cl.
CPC .......... *F03D 7/022* (2013.01); *F03D 7/0256* (2013.01); *F05B 2240/32* (2013.01); *Y02E 10/721* (2013.01)
(58) Field of Classification Search
USPC ............................................. 290/44, 54, 55
See application file for complete search history.

(56) References Cited

U.S. PATENT DOCUMENTS

| | | | | |
|---|---|---|---|---|
| 7,380,756 B1* | 6/2008 | Enloe | .................... | B64C 23/005 244/130 |
| 7,387,491 B2* | 6/2008 | Saddoughi | ............ | F03D 1/0608 415/914 |
| 8,162,610 B1 | 4/2012 | Khozikov et al. | | |
| 8,501,380 B2 | 8/2013 | Ishihara et al. | | |
| 9,067,674 B2* | 6/2015 | Nordin | .................. | B64C 23/005 |

(Continued)

FOREIGN PATENT DOCUMENTS

| | | | | |
|---|---|---|---|---|
| CN | 102200703 | | 9/2011 | |
| EP | 1995171 A2 * | 11/2008 | ........... | B64C 23/005 |

(Continued)

OTHER PUBLICATIONS

Notification of Reasons for Refusal issued May 10, 2016 in Japanese Patent Application No. 2013-058015 (with English language translation).

(Continued)

*Primary Examiner* — R. K. Arundale
(74) *Attorney, Agent, or Firm* — Oblon, McClelland, Maier & Neustadt, L.L.P.

(57) ABSTRACT

An airflow generation device of an embodiment has a main body and a voltage application unit. The main body has a base formed of an insulating material and provided with a first electrode and a second electrode. The voltage application unit generates an airflow by applying voltage between the first electrode and the second electrode. Here, the main body is formed to include a portion which gradually decreases in thickness from a center portion to an end portion.

5 Claims, 11 Drawing Sheets

(56) References Cited

U.S. PATENT DOCUMENTS

| | | | |
|---|---|---|---|
| 2009/0212164 A1* | 8/2009 | Osborne | B64C 23/005 244/205 |
| 2012/0068469 A1* | 3/2012 | Behrens | F03D 1/0641 290/55 |
| 2012/0267892 A1 | 10/2012 | Matsuda et al. | |
| 2012/0280501 A1 | 11/2012 | Tanaka et al. | |
| 2012/0287550 A1* | 11/2012 | Tanaka | F01D 5/14 361/225 |

FOREIGN PATENT DOCUMENTS

| | | |
|---|---|---|
| EP | 2 514 965 A2 | 10/2012 |
| EP | 2 520 799 A1 | 11/2012 |
| JP | 2007-317656 A | 12/2007 |
| JP | 2008-25434 | 2/2008 |
| JP | 2011-203433 | 10/2011 |
| JP | 2012-38587 A | 2/2012 |
| JP | 2012-225296 | 11/2012 |
| JP | 2012-249510 A | 12/2012 |
| KR | 10/2011/0107721 | 10/2011 |
| KR | 10-2012-0119996 A | 11/2012 |
| WO | WO 2012/081704 A1 | 6/2012 |

OTHER PUBLICATIONS

Combined Chinese Office Action and Search Report issued on Mar. 22, 2016 in Patent Application No. 201410084169.X (with partial English language translation and English language translation of categories of cited documents).

Office Action issued Jun. 19, 2015 in Korean Patent Application No. 10-2014-0023912.

Extended European Search Report issued on Dec. 9, 2016 in Patent Application No. 14160778.8.

* cited by examiner

AIRFLOW GENERATION DEVICE AND WIND POWER GENERATION SYSTEM

CROSS REFERENCE TO RELATED APPLICATIONS

This application is based upon and claims the benefit of priority from the prior Japanese Patent Application No. 2013-058015, filed on Mar. 21, 2013; the entire contents of which are incorporated herein by reference.

FIELD

Embodiments described herein relate generally to an airflow generation device and a wind power generation system.

BACKGROUND

A wind power generation system generates electric power by utilizing wind power energy which is renewable energy.

In the wind power generation system, a separated flow may occur on a surface of a windmill blade, causing a fluctuation of power generation amount. For example, when a wind speed and a wind direction fluctuate suddenly, the velocity triangle around windmill blades deviates largely from a rating point, and thus the separated flow occurs in a wide range. It is not possible to respond sufficiently to rapid fluctuations of wind speed and wind direction by adjustment of yaw angle or pitch angle. Accordingly, in the wind power generation system, there may be cases where it is difficult to maintain power generation output stably and it is uneasy to increase efficiency.

As a measure for this, it has been proposed to dispose an airflow generation device on the surface of a windmill blade to generate a plasma airflow, thereby suppressing occurrence of separated flow. Further, it has been proposed to dispose a plurality of airflow generation devices in a blade span direction and control the plurality of airflow generation devices according to the separated flow which differs depending on a position in a radial direction of a rotor.

When the airflow generation device is disposed on the surface of a windmill blade, a step may be formed on the surface of the windmill blade by the airflow generation device. Thus, there may be cases where a flow around the windmill blade is disturbed, making it uneasy to maintain power generation output stably.

When the plurality of airflow generation devices are laid side by side in the blade span direction on a windmill blade having a long span length, it is necessary to connect connection conducting wires to each of the plurality of airflow generation devices. The connection conducting wires are high-voltage wires and thick, and thus there may be cases where a flow is disturbed around the windmill blade by a step due to the connection conducting wires, and it is not possible to maintain power generation output stably.

When the airflow generation devices are retrofitted to windmill blades in an already built wind power generation system in particular, there may be cases where modification of the windmill blades are not allowed for securing characteristics such as strength. For example, it may be not allowed to cut away part of the surface of a windmill blade and fit the airflow generation devices in the cut part, or bore a hole in the windmill blade to place connection conducting wires through this hole. Accordingly, as described above, a step is formed on the surface of the windmill blade, which can make it more difficult to maintain power generation output stably and uneasy to improve efficiency.

DETAILED DESCRIPTION

In embodiments, an airflow generation device of an embodiment has a main body and a voltage application unit. The main body has a base formed of an insulating material and provided with a first electrode and a second electrode. The voltage application unit generates an airflow by applying voltage between the first electrode and the second electrode. Here, the main body is formed to include a portion which gradually decreases in thickness from a center portion to an end portion.

Embodiments will be described with reference to the drawings.

First Embodiment

[A] Overall Structure of a Wind Power Generation System 1

Figure 1:
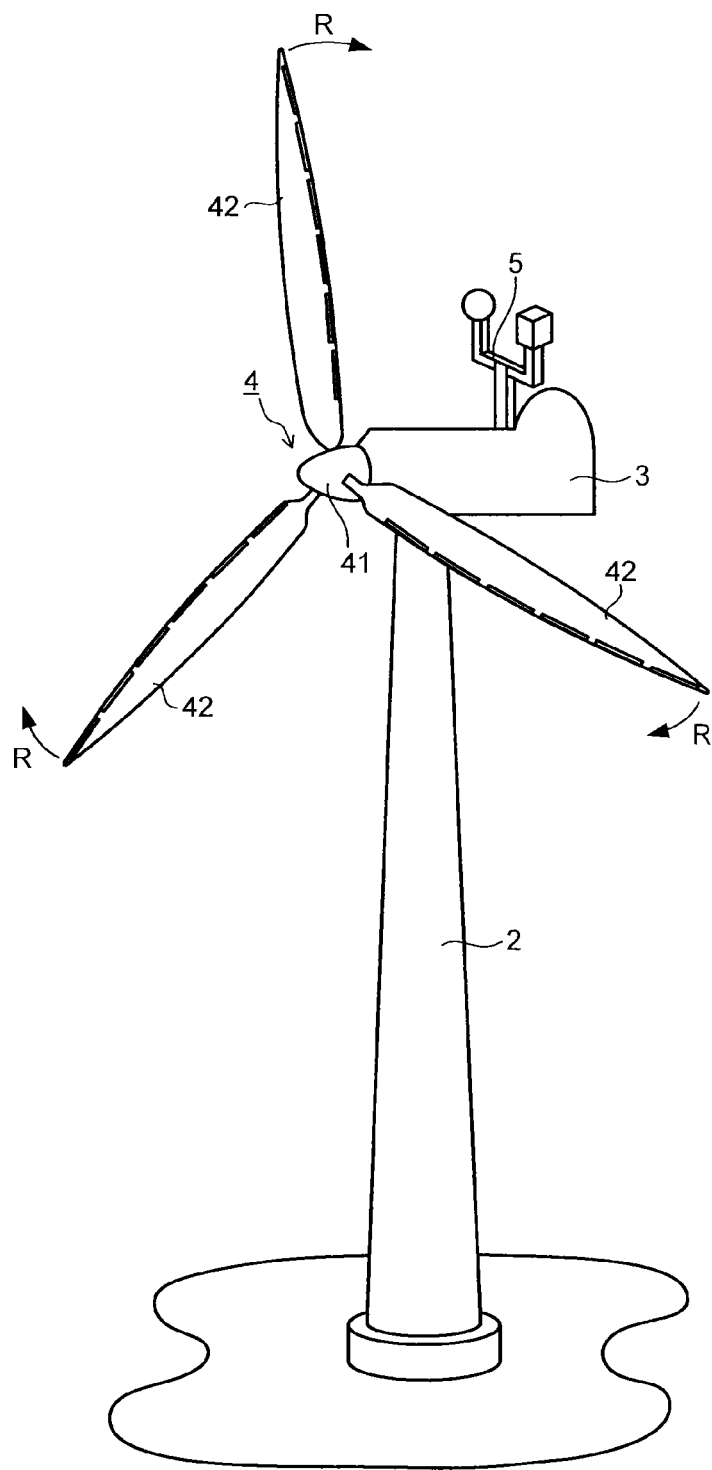
FIG. 1 is a view illustrating an overview of a wind power generation system according to a first embodiment.

FIG. 1 is a view illustrating an overview of a wind power generation system according to a first embodiment.

The wind power generation system 1 is, as illustrated in FIG. 1, a propeller windmill of upwind type and has a tower 2, a nacelle 3, a rotor 4, and an aerovane unit 5.

Respective units constituting the wind power generation system 1 will be described in order.

[A-1] Tower 2

The tower 2 extends along a vertical direction and has a lower end portion fixed to a base (omitted from the illustration) embedded in the ground.

[A-2] Nacelle 3

The nacelle 3 is disposed on an upper end portion of the tower 2.

The nacelle 3 is supported rotatably about an axis in the vertical direction on the upper end portion of the tower 2 for adjusting a yaw angle.

[A-3] Rotor 4

The rotor 4 is supported rotatably on one side end portion of the nacelle 3 and rotates in a rotational direction R with a horizontal direction being a rotational axis.

The rotor 4 has a hub 41 and a plurality of windmill blades 42 (blades).

In the rotor 4, the hub 41 includes a tip cover whose outer shape is a semiellipsoidal shape, and is formed to have an outside diameter of an outer peripheral surface which increases gradually from an upwind side to a downwind side.

On the rotor 4, the plurality of windmill blades 42 are provided at intervals in the rotational direction R about the hub 41. For example, three windmill blades 42 are provided, and one ends of the respective blades are supported rotatably on the hub 41 for adjustment of pitch angle.

Figure 2:
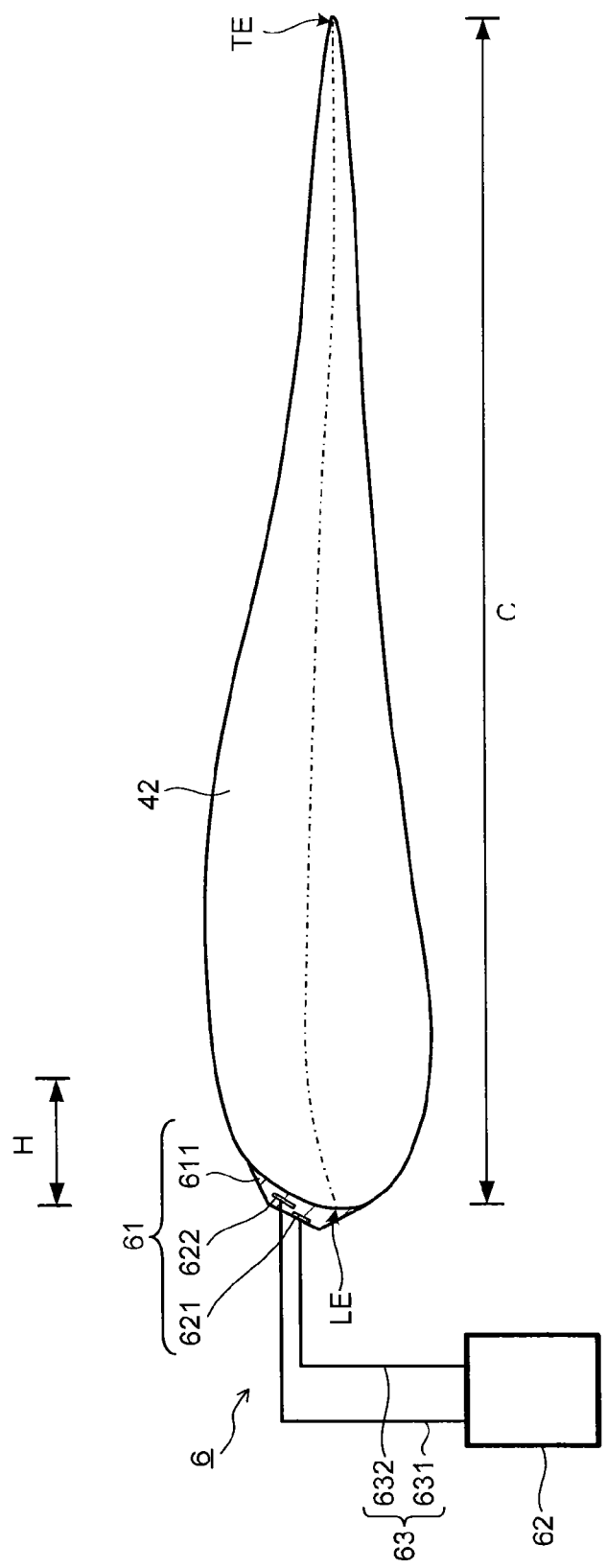
FIG. 2 is a view illustrating one windmill blade in the wind power generation system according to the first embodiment.

FIG. 2 is a view illustrating one windmill blade 42 in the wind power generation system according to the first embodiment. FIG. 2 illustrates a cross section of the windmill blade 42 along a blade thickness direction.

A main body 61 of an airflow generation device 6 is disposed on the windmill blade 42 as illustrated in FIG. 2.

Further, as illustrated in FIG. 1, a plurality of main bodies 61 of airflow generation devices 6 are laid side by side along a blade span direction on each of the plurality of windmill blades 42.

Details of the airflow generation device 6 will be described later.

[A-4] Aerovane Unit 5

The aerovane unit 5 is attached to an upper surface of the nacelle 3 on the downwind side of the windmill blades 42 as illustrated in FIG. 1.

Measurement data of wind speed and wind direction by the aerovane unit 5 are outputted to a control unit (not illustrated). Then, according to the measurement data, the control unit adjusts the yaw angle and the pitch angle. Further, according to the measurement data, the control unit controls operation of the airflow generation devices 6.

[B] Detailed Structure of the Airflow Generation Device 6

Figure 3:
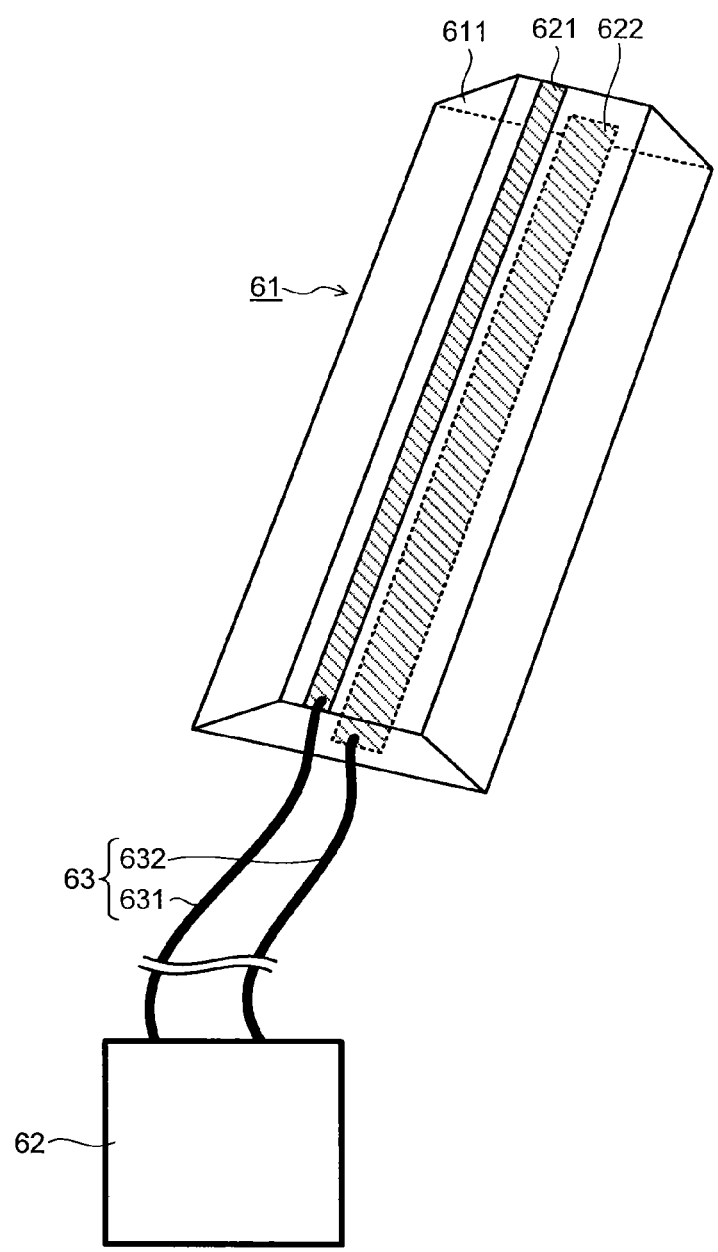
FIG. 3 is a view schematically illustrating an airflow generation device in the wind power generation system according to the first embodiment.

FIG. 3 is a view schematically illustrating the airflow generation device 6 in the wind power generation system according to the first embodiment. FIG. 3 illustrates a state before the main body 61 of the airflow generation device 6 is disposed on the windmill blade 42 (see FIG. 2), and the main body 61 is illustrated in perspective.

As illustrated in FIG. 3, the airflow generation device 6 has a main body 61, a voltage application unit 62, and a connecting part 63. Respective parts constituting the airflow generation device 6 will be described in order.

[B-1] Main Body 61

In the airflow generation device 6, the main body 61 includes, as illustrated in FIG. 3, a base 611, a first electrode 621 (surface electrode), and a second electrode 622 (internal electrode). In the main body 61, the base 611 is provided with the first electrode 621 and the second electrode 622, and is formed to include portions which gradually decrease in thickness from a center portion to an end portion.

In the main body 61, the base 611 is formed of an insulating material (dielectric). For example, the base 611 is formed using a resin such as a silicone resin (silicone rubber), an epoxy resin, a fluorine resin, or the like, and is flexible. Besides them, the base 611 may be, for example, formed by layering a plurality of prepreg sheets obtained by impregnating a mica paper with an epoxy resin.

In the main body 61, each of the first electrode 621 and the second electrode 622 is formed of, for example, a conductive material such as a metal material.

The main body 61 is formed by, for example, one of various types of processing, such as pressing and extrusion.

Figure 4A:
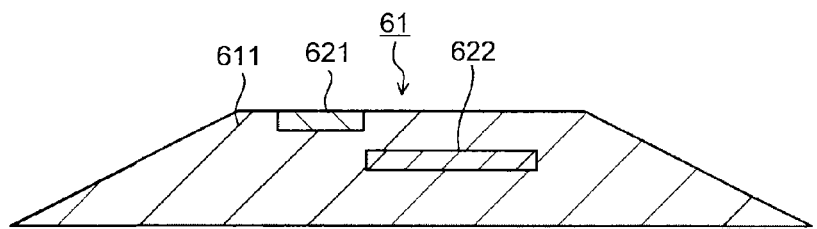
FIG. 4A is a view illustrating a main body of the airflow generation device in the wind power generation system according to the first embodiment.
Figure 4B:
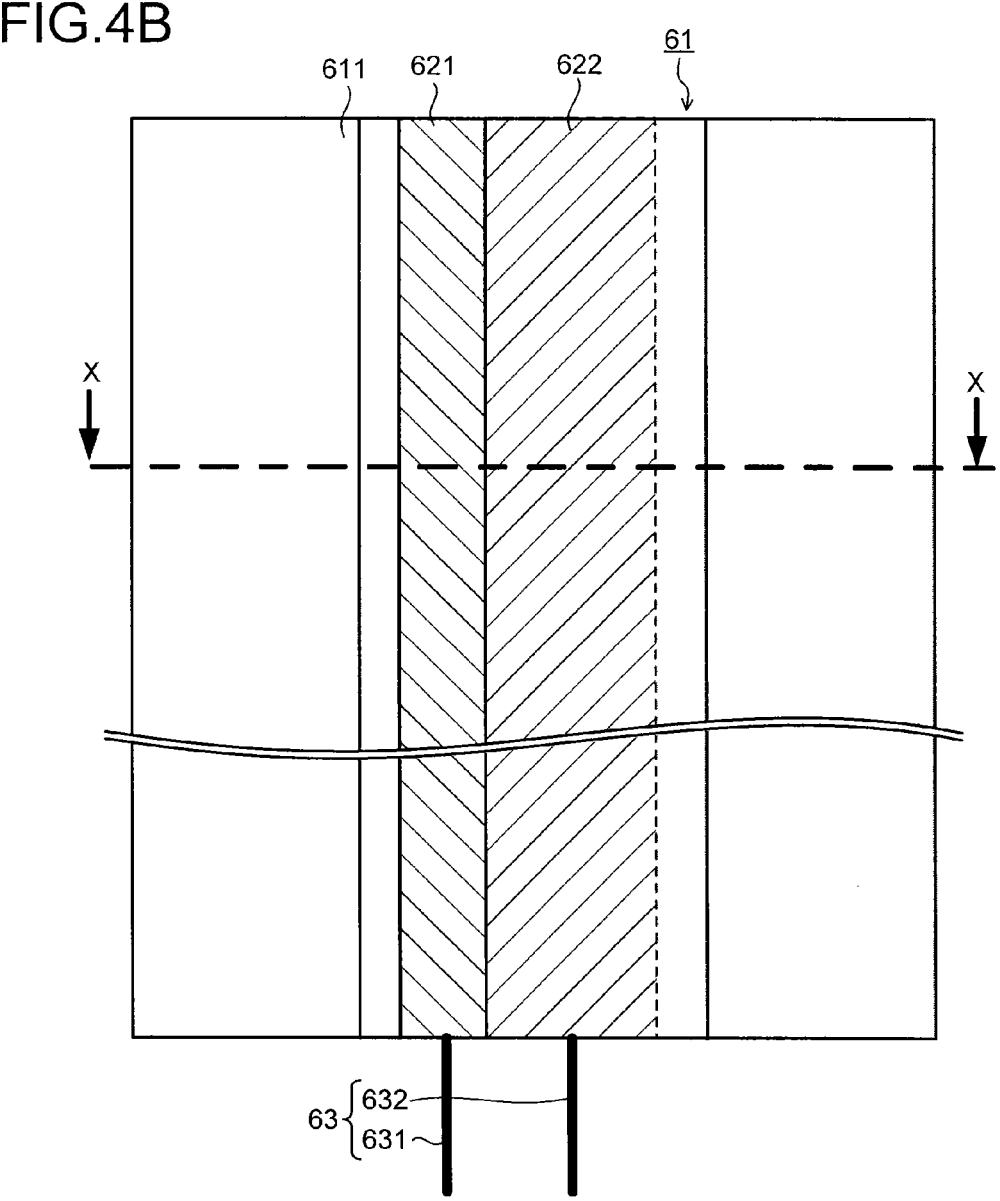
FIG. 4B is a view illustrating the main body of the airflow generation device in the wind power generation system according to the first embodiment.

FIG. 4A and FIG. 4B are views illustrating the main body 61 of the airflow generation device 6 in the wind power generation system according to the first embodiment. Here, FIG. 4A is a cross-sectional view, and FIG. 4B is a top view. FIG. 4A corresponds to a cross section of an X-X portion in FIG. 4B.

In the main body 61, the first electrode 621 is a plate as illustrated in FIG. 4A and FIG. 4B. The first electrode 621 is provided in a surface (upper surface) of the base 611 as illustrated in FIG. 4A. Specifically, the first electrode 621 is disposed so that an upper surface is exposed and surfaces other than the upper surface (a lower surface and side surfaces) are in contact with the base 611. Further, as illustrated in FIG. 4B, the first electrode 621 extends linearly.

In the main body 61, the second electrode 622 is a plate similar to the first electrode 621, as illustrated in FIG. 4A and FIG. 4B. Unlike the first electrode 621, the second electrode 622 is provided inside the base 611 as illustrated in FIG. 4A. Specifically, the second electrode 622 is disposed so that an upper surface, a lower surface, and side surfaces are in contact with the base 611, and is disposed at a position deeper than the first electrode 621. Further, as illustrated in FIG. 4B, the second electrode 622 extends linearly in the same direction (vertical direction in FIG. 4B) as an extending direction (first direction, longitudinal direction) in which the first electrode 621 extends. Here, the second electrode 622 is laid side by side with the first electrode 621 in an orthogonal direction (second direction) (lateral direction in FIG. 4B) with respect to the extending direction (first direction) of the first electrode 621.

In the main body 61, as illustrated in FIG. 4, both the first electrode 621 and the second electrode 622 are provided in the center portion located centrally in the orthogonal direction (second direction) with respect to the extending direction (first direction) of the first electrode 621 and the second electrode 622.

In this embodiment, the main body 61 is formed to have a constant thickness in the center portion, and gradually decrease in thickness from the center portion to both end portions. That is, in the main body 61, a cross section along the direction (second direction) in which the first electrode 621 and the second electrode 622 lay side by side has a trapezoidal shape, in which an upper surface is located along a lower surface in the center portion, and an upper surface inclines with respect to the lower surface in the both end portions.

As illustrated in FIG. 2, the main body 61 is provided on a surface of the windmill blade 42. The main body 61 is bonded to the windmill blade 42 so that a surface (lower surface) opposite to the surface (upper surface) where the first electrode 621 is provided (see FIG. 4A) adheres to a surface on a blade back side of the windmill blade 42. Specifically, the main body 61 is fixed by bonding to the upper surface of the windmill blade 42 so that, in the cross section along the blade thickness direction of the windmill blade 42, the width of a bottom surface of the trapezoid of the main body 61 of a side close to the windmill blade 42 is wider than the width of the main body 61 of a side far from the windmill blade 42.

Further, as illustrated in FIG. 2, in the portion of a leading edge LE side in the surface (upper surface) on the blade back side of the windmill blade 42, the main body 61 is disposed so that the first electrode 621 and the second electrode 622 lay side by side in order from the leading edge LE to a trailing edge TE. Specifically, the main body 61 is attached so that the first electrode 621 and the second electrode 622 are disposed in a range H of 10% or less of a blade cord length C from the leading edge LE. Attaching the main body 61 in this manner allows suppressing occurrence of separated flow effectively and hence is preferred.

Besides them, as illustrated in FIG. 1, a plurality of main bodies 61 are laid side by side along the blade span (blade width) direction on each of the plurality of windmill blades 42. Here, the plurality of main bodies 61 are disposed at intervals from each other, and the extending direction (first direction) of the first electrode 621 and the second electrode 622 is along the blade span (blade width) direction.

[B-2] Voltage Application Unit 62

In the airflow generation device 6, as illustrated in FIG. 3, the voltage application unit 62 is connected electrically to the main body 61 via the connecting part 63, and applies voltage between the first electrode 621 and the second electrode 622.

The voltage application unit 62 includes, for example, a power supply (omitted from the illustration) disposed in a blade root portion of the windmill blade 42, and applies voltage between the first electrode 621 and the second electrode 622 of the main body 61 by controlling the power supply (omitted from the illustration).

The voltage application unit 62 generates a plasma airflow due to dielectric barrier discharge on the surface (upper surface) of the main body 61 by applying voltage between the first electrode 621 and the second electrode 622 according to a control signal outputted from a control unit (omitted from the illustration), so as to suppress occurrence of separated airflow.

Here, the voltage application unit 62 is structured to apply voltage independently to each of the plurality of main body units 61 (see FIG. 1).

[B-3] Connecting Part 63

In the airflow generation device 6, the connecting part 63 includes a pair of connecting wires 631, 632.

In the connecting part 63, one connecting wire 631 has one end connected electrically to the first electrode 621, and the other end connected electrically to the voltage application unit 62.

In the connecting part 63, the other connecting wire 632 has one end connected electrically to the second electrode 622, and the other end connected electrically to the voltage application unit 62.

Although omitted from the illustration, a plurality of pairs of connecting wires 631, 632 are provided respectively corresponding to the plurality of main bodies 61 (see FIG. 1) constituting the airflow generation device 6, and are disposed to extend from the hub 41 side of the rotor 4 to a tip side of the windmill blade 42.

[C] Summary

As described above, in the wind power generation system 1 of this embodiment (see FIG. 1), the main body 61 of the airflow generation device 6 is disposed so that its lower surface adheres to the upper surface of the windmill blade 42 (see FIG. 2). In the main body 61 of the airflow generation device 6, the first electrode 621 and the second electrode 622 are provided in the base 611 formed of an insulating material such as resin, and generate an airflow on the surface by applying voltage between the first electrode 621 and the second electrode 622 (see FIG. 3).

Here, the main body 61 is formed so that, when disposed on an outer surface of the windmill blade 42, a cross section along the blade thickness direction of the windmill blade 42 gradually decreases in thickness from the center portion to the end portion on the leading edge LE side and the end portion on the trailing edge TE side (see FIG. 3, FIG. 3, FIG. 4).

Thus, in this embodiment, when the main body 61 of the airflow generation device 6 is disposed on the surface of the windmill blade 42, a large step is not formed due to the main body 61. As a result, disturbance of flow around the windmill blade 42 due to the step can be suppressed, and thus power generation output can be made stable. Then, dynamic control by the airflow generation device 6 can be performed while retaining performance of the windmill blade 42, and thus the wind power generation system 1 with high efficiency can be realized.

Therefore, in this embodiment, power generation output can be maintained stably, and improvement of power generation efficiency can be realized easily.

[D] Modification Example

In the airflow generation device 6 of the above-described embodiment, the cross section of the main body 61 along the blade thickness direction of the windmill blade 42 is a trapezoidal shape whose magnitudes of two internal angles (base angles) located on both ends of a lower base are equal to each other (isosceles trapezoidal shape). That is, the cross section of the main body 61 is formed to gradually decrease in thickness at the same ratio as each other in both the direction from the center portion to the end portion on the leading edge LE side and the direction from the center portion to the end portion on the trailing edge TE side (see FIG. 2, FIG. 3, FIG. 4). However, it is not limited to this. The cross section of the main body 61 may be such that the magnitudes of two internal angles on the both ends of the lower base are not equal to each other.

Further, the main body 61 may be formed so that the cross section of the main body 61 gradually decreases in thickness in either one of the direction from the center portion to the end portion on the leading edge LE side and the direction from the center portion to the end portion on the trailing edge TE side. Specifically, the cross section of the main body 61 may be formed to gradually decrease in thickness in either one of the direction from the center portion to the end portion on the leading edge LE side and the direction from the center portion to the end portion on the trailing edge TE side. When the main body 61 is provided in the vicinity of the leading edge LE of the windmill blade 42 in particular, the cross section may be formed to gradually decrease in thickness from the center portion to the trailing edge TE side on the side of the trailing edge TE of the main body 61. Note that when the main body 61 is disposed in a center portion on the upper surface of the windmill blade 42, similarly to the above-described embodiment, preferably, the thickness gradually decreases from the center portion to the both end portions of the leading edge LE side and the trailing edge TE side.

Besides them, the cross section of the main body 61 may be formed so that two corner portions located on both ends of an upper base of the trapezoidal shape are curved. Further, in consideration of installation, the cross section of the main body 61 may be in a substantially trapezoidal shape by making the center portion of the main body 61 have a thickness of about, for example, a few millimeters and the end portions of the main body 61 have a thickness of about, for example, ¼ with respect to the thickness of the center portion.

Second Embodiment

[A] Structure and the Like

Figure 5:
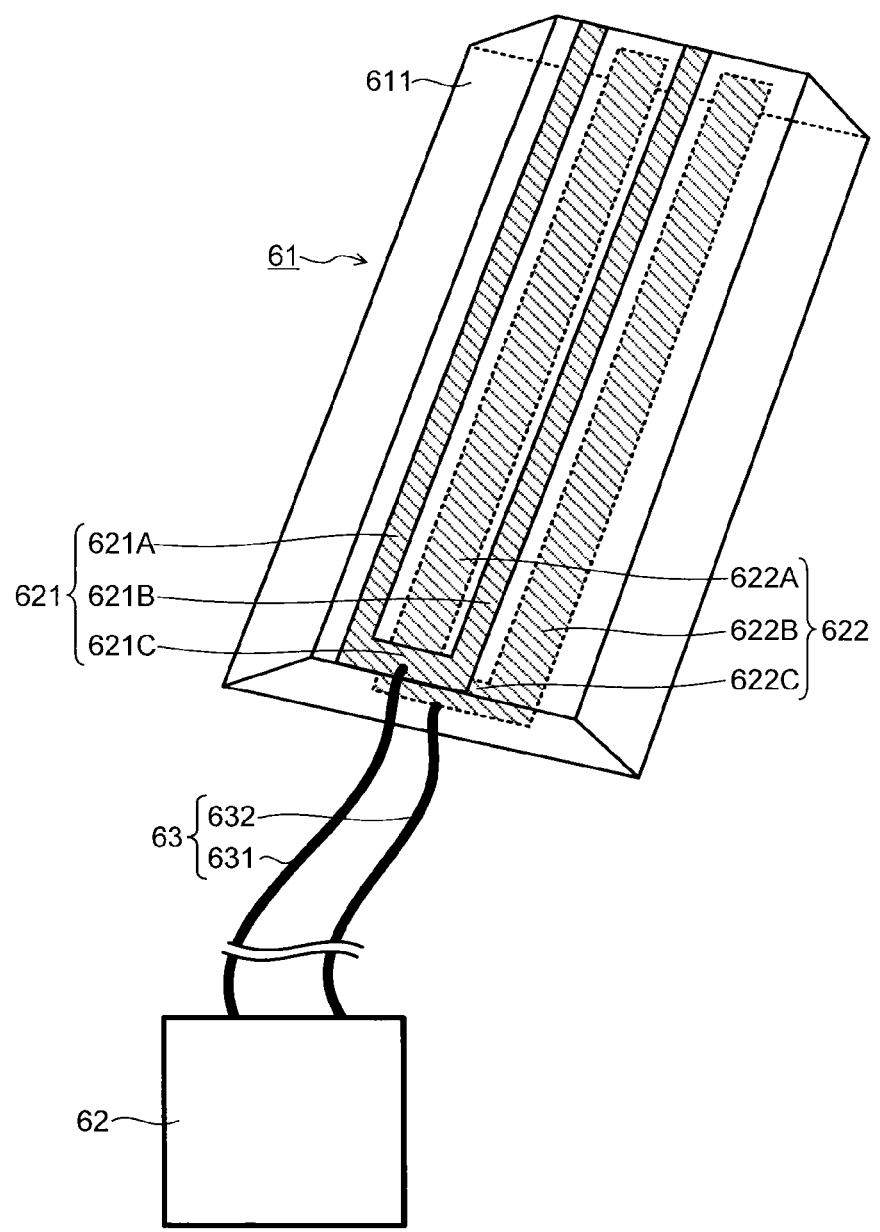
FIG. 5 is a view schematically illustrating an airflow generation device in a wind power generation system according to a second embodiment.

FIG. 5 is a view schematically illustrating an airflow generation device 6 in a wind power generation system according to a second embodiment. FIG. 5 illustrates, similarly to FIG. 3, a state before a main body 61 of an airflow generation device 6 is disposed on the windmill blade 42 (see FIG. 2), and the main body 61 is illustrated in perspective.

As illustrated in FIG. 5, this embodiment is different from the case of the first embodiment in the main body 61 of the airflow generation device 6 (see FIG. 3). This embodiment is similar to the case of the above-described embodiment except the above point and related points. Thus, descriptions of overlapping parts in this embodiment are omitted appropriately.

The airflow generation device 6 has, as illustrated in FIG. 5, similarly to the case of the first embodiment (see FIG. 3), a main body 61, a voltage application unit 62, and a connecting part 63.

However, in this embodiment, the main body 61 is different from that of the case of the first embodiment in modes of both the first electrode 621 (surface electrode) and the second electrode 622 (internal electrode).

Specifically, in the main body 61, the first electrode 621 includes a plurality of extending portions 621A, 621B (first extending portions) and a connecting part 621C (first connecting part), unlike the case of the first embodiment.

In the first electrode 621, the plurality of extending portions 621A, 621B each extend linearly and are laid side by side at an interval in a direction (second direction) orthogonal to an extending direction (first direction) thereof. The connecting part 621C extends in a direction orthogonal to the extending direction of the plurality of extending portions 621A, 621B. The connecting part 621C is coupled to one end of each of the plurality of extending portions 621A, 621B, and electrically connects the plurality of extending portions 621A, 621B.

In the main body 61, similarly to the first electrode 621, the second electrode 622 includes a plurality of extending portions 622A, 622B (second extending portions) and a connecting part 622C (second connecting part), unlike the case of the first embodiment.

In the second electrode 622, the plurality of extending portions 622A, 622B each extend linearly and are laid side by side at an interval in the direction (second direction) orthogonal to the extending direction (first direction) thereof. Here, the plurality of extending portions 622A, 622B are laid side by side at the same pitch as the extending portions 621A, 621B of the first electrode 621 in the direction (second direction) orthogonal to the extending direction (first direction). The connecting part 622C extends in the direction orthogonal to the extending direction of the plurality of extending portions 622A, 622B. The connecting part 622C is coupled to one end of each of the plurality of extending portions 622A, 622B, and electrically connects the plurality of extending portions 622A, 622B.

In this embodiment, the main body 61 is formed to have a constant thickness in the center portion, and gradually decrease in thickness from the center portion to both end portions, similarly to the case of the first embodiment.

Although omitted from the illustration, similarly to the case of the first embodiment, the main body 61 is disposed on the surface of the windmill blade 42 (see FIG. 2). That is, the plurality of extending portions 621A, 621B constituting the first electrode 621 and the plurality of extending portions 622A, 622B constituting the second electrode 622 are laid side by side alternately from the leading edge LE toward the trailing edge TE on the windmill blade 42.

[B] Summary

As described above, in this embodiment, the main body 61 of the airflow generation device 6 is formed, similarly to the case of the first embodiment, to gradually decrease in thickness from the center portion to the end portions (see FIG. 5). Thus, in this embodiment, when the main body 61 of the airflow generation device 6 is disposed on the surface of the windmill blade 42 (see FIG. 1, FIG. 2), a large step is not formed due to the main body 61. As a result, disturbance of flow around the windmill blade 42 due to the step can be suppressed, and thus power generation output can be made stable.

Further, in this embodiment, in the first electrode 621, the plurality of extending portions 621A, 621B lay side by side at an interval, and similarly, in the second electrode 622, the plurality of extending portions 622A, 622B lay side by side at an interval at the same pitch as the plurality of extending portions 621A, 621B constituting the first electrode 621. In this manner, a plurality of pairs of the extending portions 621A, 621B constituting the first electrode 621 and the extending portions 622A, 622B constituting the second electrode 622 are provided. Thus, by applying voltage to each of the plurality of pairs, a plasma airflow due to dielectric barrier discharge is generated. As a result, a more effective plasma airflow can be generated, and thus it is possible to more effectively suppress occurrence of separated flow.

Therefore, in this embodiment, power generation output can be maintained stably, and improvement of power generation efficiency can be realized easily.

In the case of a large windmill with a rotor diameter exceeding 80 m in particular, the blade cord length of the windmill blade 42 can be 2 to 4 m or more, and the flow can be disturbed largely in a wide area. However, by structuring similarly to this embodiment, the plasma airflow can be generated more intensely, and occurrence of separated flow can be suppressed effectively.

Third Embodiment

[A] Structure and the Like

Figure 6:
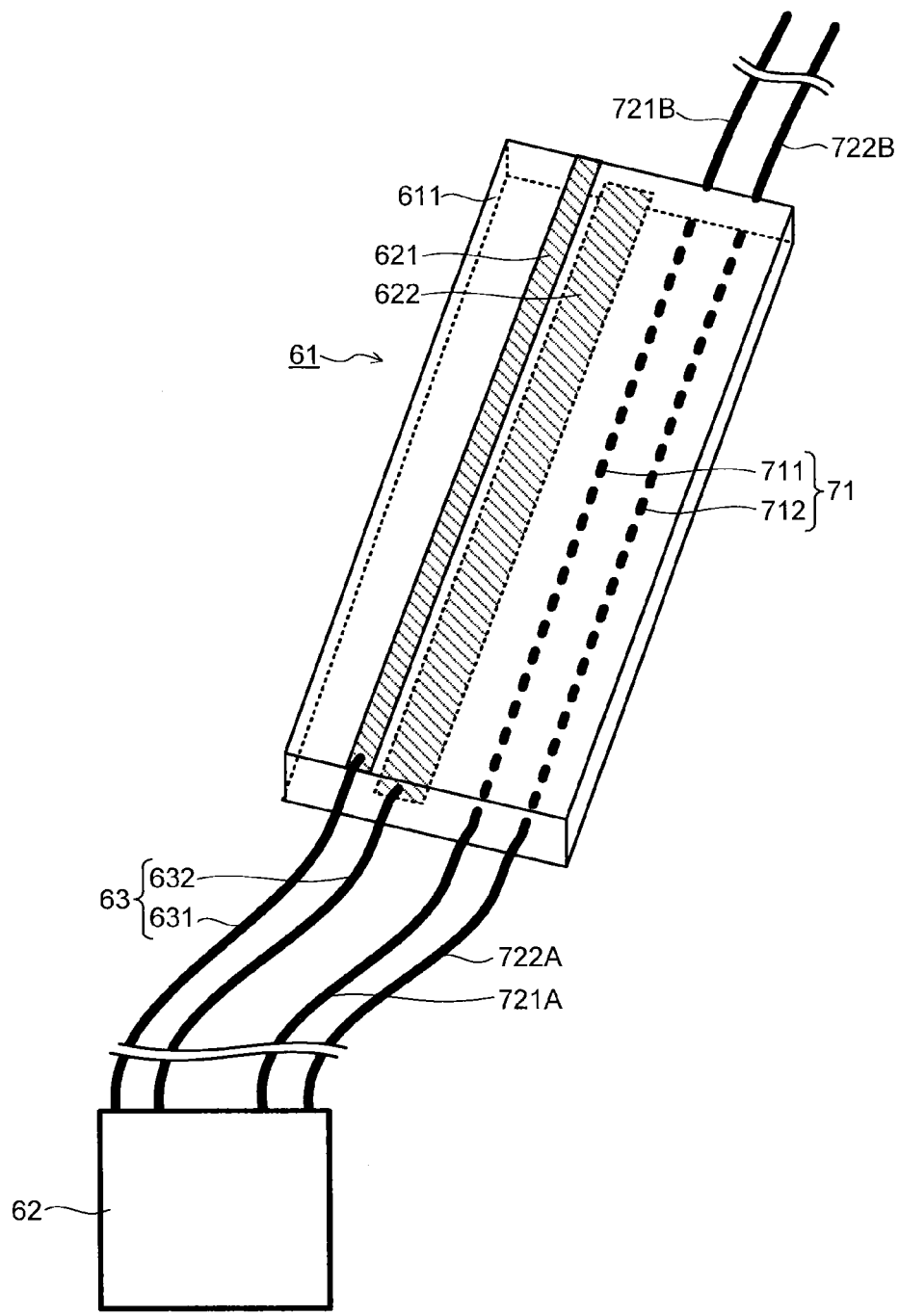
FIG. 6 is a view illustrating an airflow generation device in a wind power generation system according to a third embodiment.
Figure 7A:
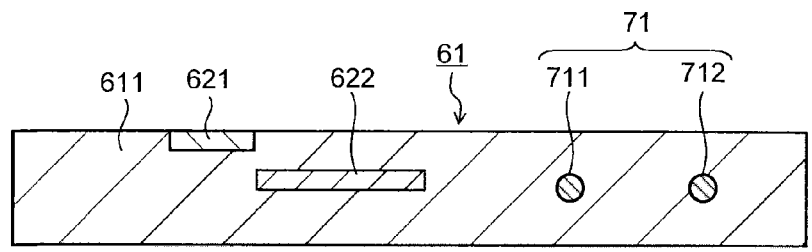
FIG. 7A is a view illustrating the airflow generation device in the wind power generation system according to the third embodiment.
Figure 7B:
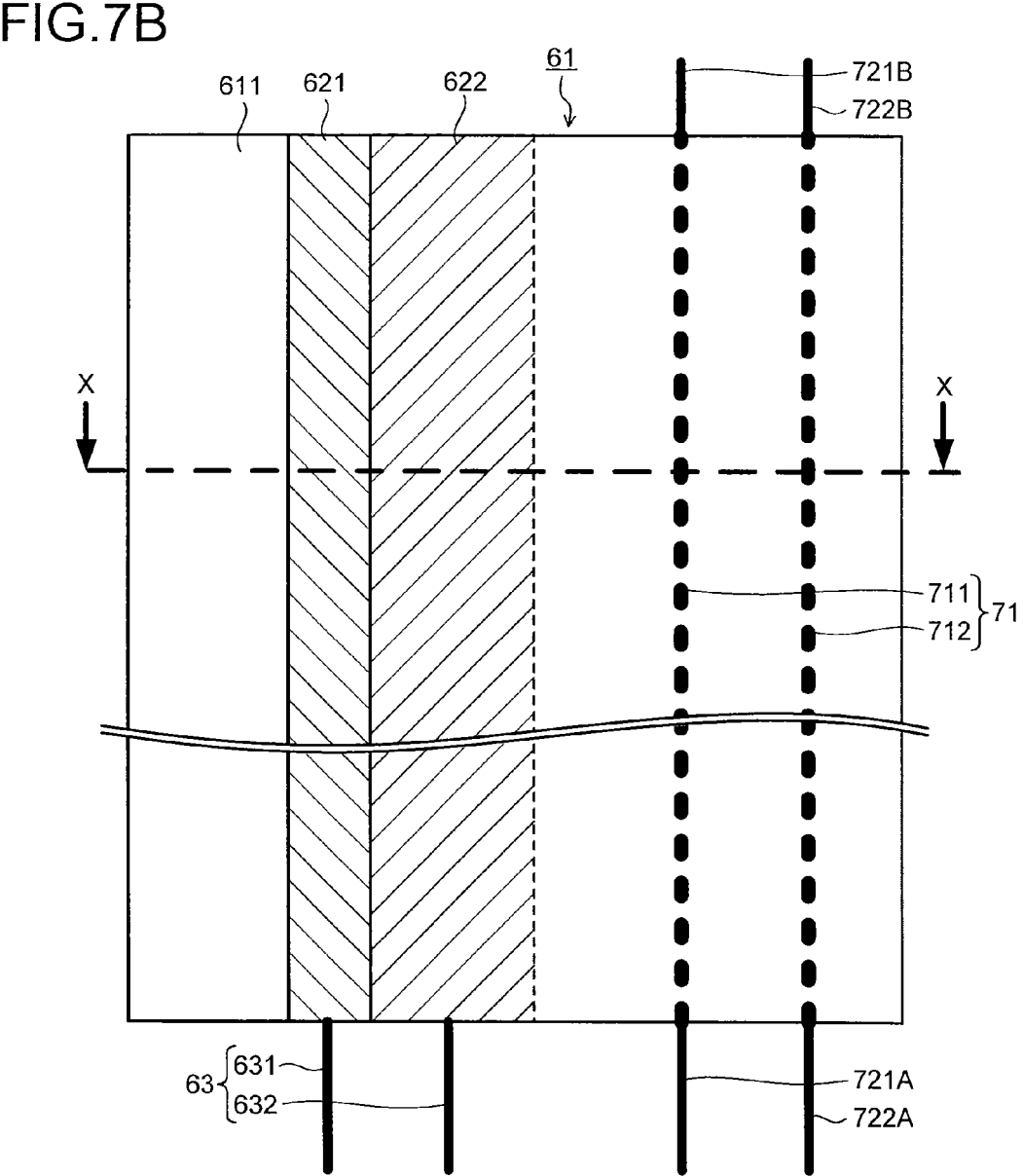
FIG. 7B is a view illustrating the airflow generation device in the wind power generation system according to the third embodiment.

FIG. 6, FIG. 7A, FIG. 7B are views illustrating an airflow generation device 6 in a wind power generation system according to a third embodiment.

FIG. 6 illustrates, similarly to FIG. 3, a state before a main body 61 of an airflow generation device 6 is disposed on the windmill blade 42 (see FIG. 2), and the main body 61 is illustrated in perspective.

FIG. 7A and FIG. 7B are views illustrating, similarly to FIG. 4, the main body 61 of the airflow generation device 6. Here, FIG. 7A is a cross-sectional view and FIG. 7B is a top view. FIG. 7A corresponds to a cross section of the X-X portion in FIG. 7B.

In this embodiment, as illustrated in FIG. 6, FIG. 7A, FIG. 7B, the shape of the main body 61 is different from that of the case of the first embodiment (see FIG. 3 and FIG. 4). Also, a connection conducting wire 71 is further provided. This embodiment is similar to the case of the above-described embodiment except the above point and related points. Thus, descriptions of overlapping parts in this embodiment are omitted appropriately.

As illustrated in FIG. 6, FIG. 7A, FIG. 7B, unlike the case of the first embodiment, the main body 61 is formed to have a constant thickness from a center portion to end portions. That is, a cross section of the main body 61 along a direction in which the first electrode 621 and the second electrode 622 lay side by side (second direction) is a rectangular shape.

Further, as illustrated in FIG. 6, FIG. 7A, FIG. 7B, besides including a base 611, a first electrode 621 (surface electrode), and a second electrode 622 (internal electrode), the main body 61 is provided with a connection conducting wire 71 unlike the first embodiment.

The connection conducting wire 71 is, as illustrated in FIG. 6, FIG. 7A, FIG. 7B, provided inside the base 611 in the main body 61 of the airflow generation device 6.

Here, as the connection conducting wire 71, there are disposed a plurality of connection conducting wires: a first connection conducting wire 711 and a second connection conducting wire 712. Both the first connection conducting wire 711 and the second connection conducting wire 712 extend along the extending direction (first direction) of each of the first electrode 621 and the second electrode 622 inside the main body 61. Both the first connection conducting wire 711 and the second connection conducting wire 712 are provided at different positions from the first electrode 621 and the second electrode 622 in the direction (second direction) in which the first electrode 621 and the second electrode 622 lay side by side.

To one ends (lower ends) of the first connection conducting wire 711 and the second connection conducting wire 712, connecting wires 721A, 722A are electrically connected respectively. The connecting wires 721A, 722A are, at the other ends (lower ends) opposite to one ends (upper ends) on the sides connected to the first connection conducting wire 711 and the second connection conducting wire 712, connected electrically to the voltage application unit 62.

Further, to the other ends (upper ends) of the first connection conducting wire 711 and the second connection conducting wire 712, connecting wires 721B, 722B are electrically connected respectively. The connecting wires 721B, 722B are, at the other ends (upper ends) opposite to one ends (lower ends) on the sides connected to the first connection conducting wire 711 and the second connection conducting wire 712, electrically connected respectively to a first connection conducting wire 711 and a second connection conducting wire 712 constituting another main body 61 (omitted from the illustration).

Figure 8:
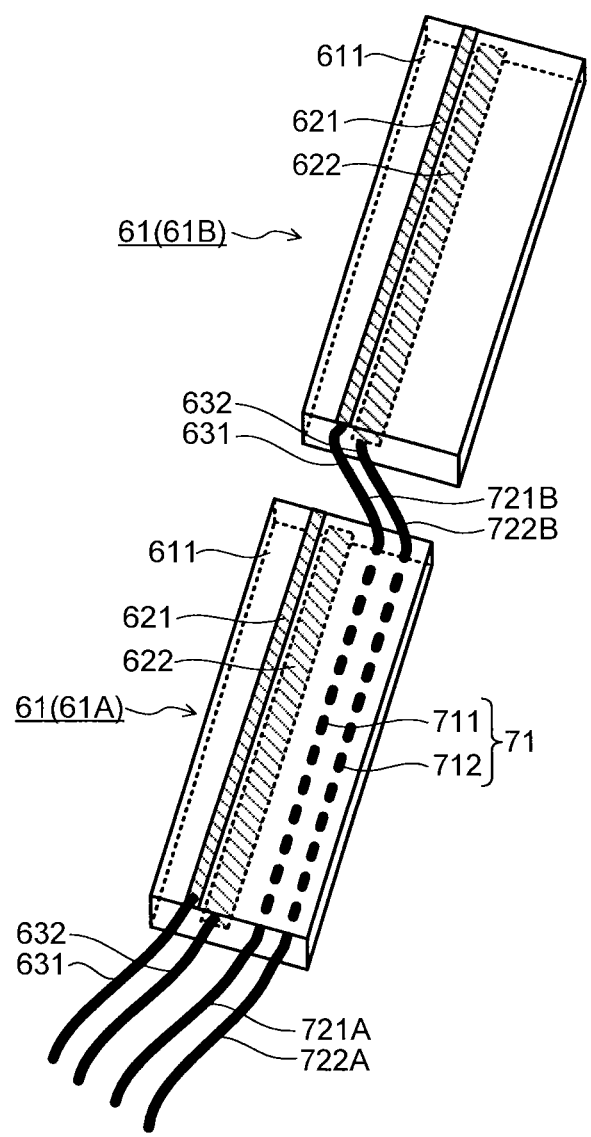
FIG. 8 is a view illustrating an appearance of main bodies of airflow generation devices when disposed on a windmill blade in the wind power generation system according to the third embodiment.

FIG. 8 is a view illustrating an appearance of main bodies 61 of airflow generation devices 6 when disposed on a windmill blade 42 (see FIG. 2) in the wind power generation system according to the third embodiment.

As illustrated in FIG. 8, among the plurality of main bodies 61, in the first main body 61A, the first connection conducting wire 711 and the second connection conducting wire 712 are provided as the connection conducting wire 71 inside the base 611. Then, the first connection conducting wire 711 and the second connection conducting wire 712 provided in the main body 61A are electrically connected respectively to a first electrode 621 and a second electrode 622 provided in another second main body 61B adjacent to the main body 61A.

Thus, both the first connection conducting wire 711 and the second connection conducting wire 712 provided in the main body 61A are used for connecting the other second main body 61B to the voltage application unit 62 in parallel.

[B] Summary

As described above, in this embodiment, the connection conducting wire 71 is provided inside the base 611 in the main body 61 of the airflow generation device 6 (see FIG. 6, FIG. 7A, FIG. 7B). Here, the plurality of connection conducting wires 71 (711, 712) are provided inside the base 611 of one main body 61 (first main body 61A) among the plurality of main bodies 61. The plurality of connection conducting wires 71 (711, 712) provided in the one main body 61 (first main body 61A) are electrically connected respectively to the first electrode 621 and the second electrode 622 provided in the other main body 61 (second main body 61B) (see FIG. 8).

Thus, in this embodiment, when the plurality of main bodies 61 are disposed side by side on the windmill blade 42, a step due to the connection conducting wire 71 decreases, and thus disturbance of flow around the windmill blade 42 can be prevented and the power generation output can be made stable.

Fourth Embodiment

[A] Structure and the Like

Figure 9:
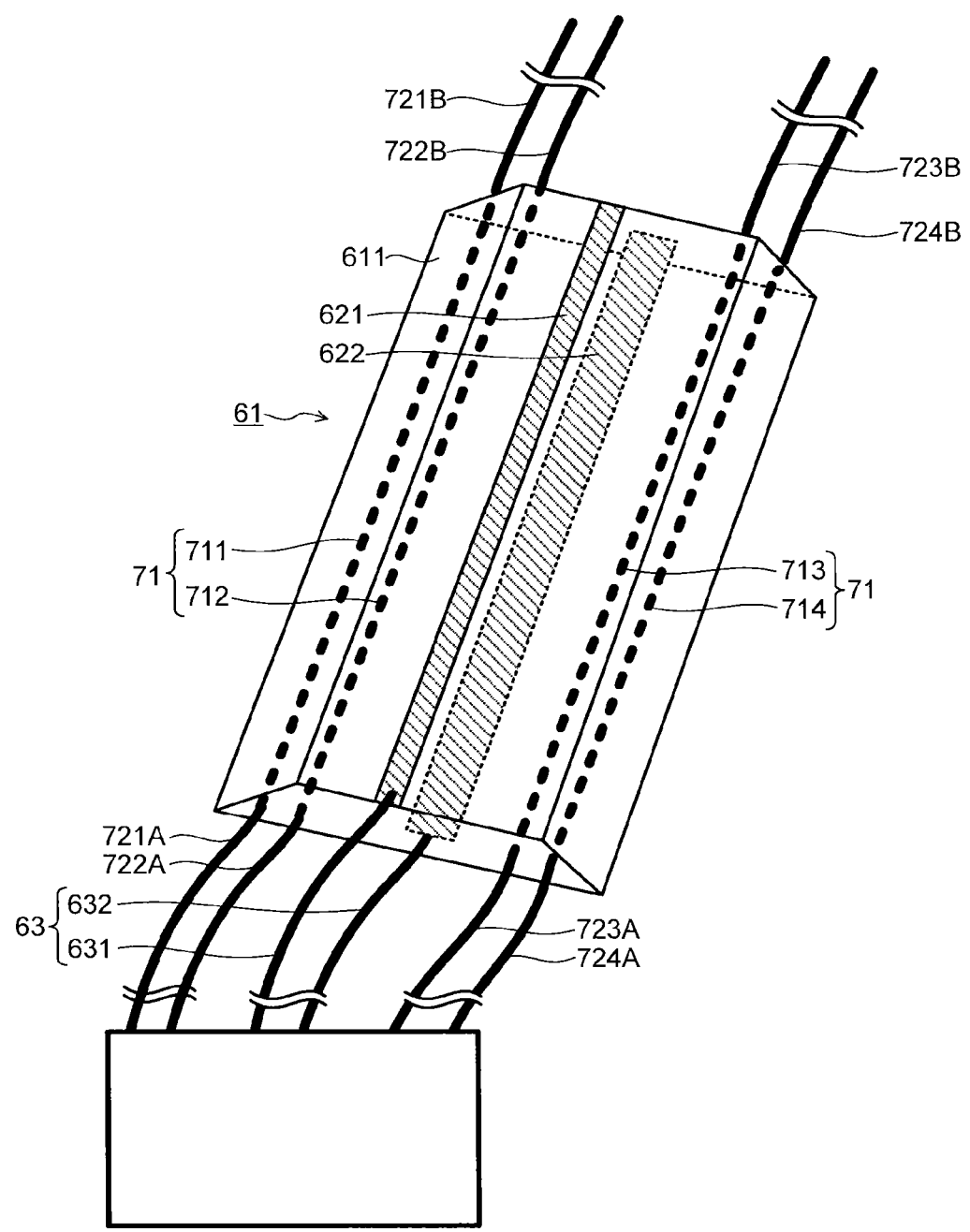
FIG. 9 is a view illustrating an airflow generation device in a wind power generation system according to a fourth embodiment.
Figure 10A:
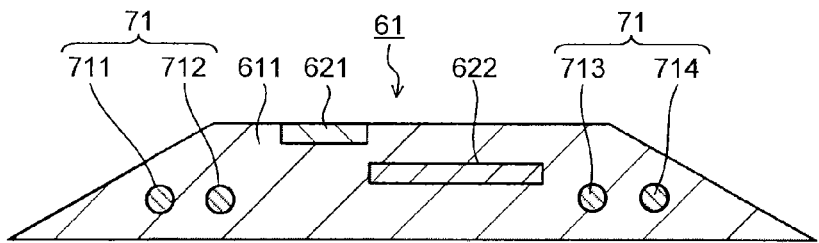
FIG. 10A is a view illustrating the airflow generation device in the wind power generation system according to the fourth embodiment.
Figure 10B:
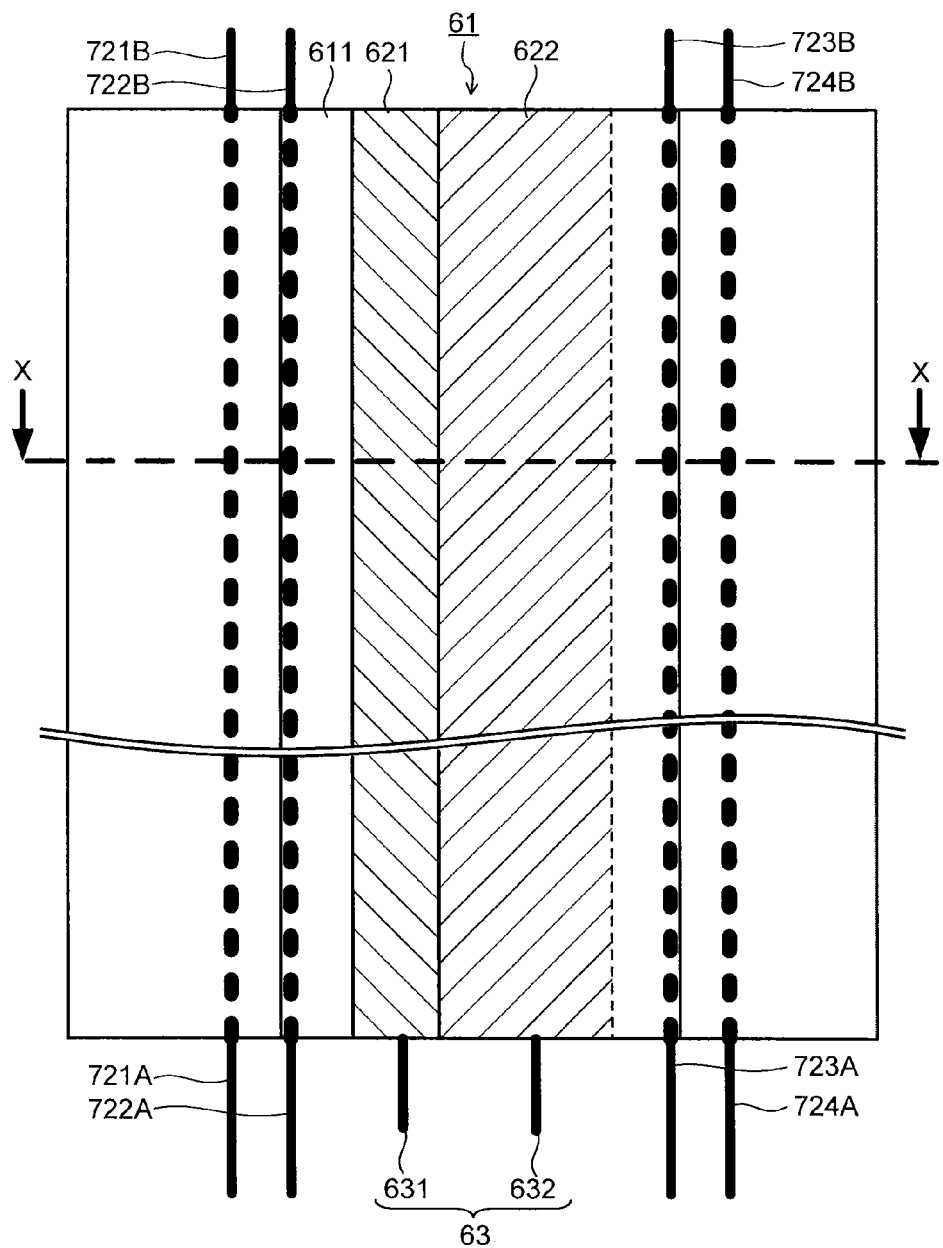
FIG. 10B is a view illustrating the airflow generation device in the wind power generation system according to the fourth embodiment.

FIG. 9, FIG. 10A, FIG. 10B are views illustrating an airflow generation device 6 in a wind power generation system according to a fourth embodiment.

FIG. 9 illustrates, similarly to FIG. 3, a state before a main body 61 of an airflow generation device 6 is disposed on the windmill blade 42 (see FIG. 2), and the main body 61 is illustrated in perspective.

FIG. 10A and FIG. 10B are views illustrating, similarly to FIG. 4, the main body 61 of the airflow generation device 6. Here, FIG. 10A is a cross-sectional view and FIG. 10B is a top view. FIG. 10A corresponds to a cross section of the X-X portion in FIG. 10B.

In this embodiment, as illustrated in FIG. 9, FIG. 10A, FIG. 10B, a connection conducting wire 71 is further provided. This embodiment is similar to the case of the first embodiment except the above point and related points. Thus, descriptions of overlapping parts in this embodiment are omitted appropriately.

In this embodiment, as illustrated in FIG. 9, FIG. 10A, FIG. 10B, the main body 61 of the airflow generation device 6 is, similarly to the case of the first embodiment, formed to have a constant thickness in a center portion, and gradually decrease in thickness from the center portion to both end portions. That is, a cross section of the main body 61 is a trapezoidal shape.

Further, as illustrated in FIG. 9, FIG. 10A, FIG. 10B, besides including a base 611, a first electrode 621 (surface electrode), and a second electrode 622 (internal electrode), the main body 61 is provided with a connection conducting wire 71 unlike the first embodiment.

The connection conducting wire 71 is, as illustrated in FIG. 9, FIG. 10A, FIG. 10B, provided inside the base 611 in the main body 61 of the airflow generation device 6. In this embodiment, as the connection conducting wire 71, there are disposed a plurality of connection conducting wires: a first connection conducting wire 711, a second connection conducting wire 712, a third connection conducting wire 713, and a fourth connection conducting wire 714.

The first to fourth connection conducting wires 711 to 714 each extend along the extending direction (first direction) of each of the first electrode 621 and the second electrode 622 inside the main body 61. Here, a pair of the first connection conducting wire 711 and the second connection conducting wire 712 and a pair of the third connection conducting wire 713 and the fourth connection conducting wire 714 are provided so as to sandwich both the first electrode 621 and the second electrode 622 in the direction (second direction) in which the first electrode 621 and the second electrode 622 lay side by side.

To one ends (lower ends) of the first to fourth connection conducting wires 711 to 714, connecting wires 721A to 724A are electrically connected respectively. The connecting wires 721A to 724A are, at the other ends (lower ends) opposite to one ends (upper ends) on the sides connected to the first to fourth connection conducting wires 711 to 714, connected electrically to the voltage application unit 62.

Further, to the other ends (upper ends) of the first to fourth connection conducting wires 711 to 714, connecting wires 721B to 724B are electrically connected respectively. The connecting wires 721B to 724B are, at the other ends (upper ends) opposite to one ends (lower ends) on the sides connected to the first connection conducting wire 711 and the second connection conducting wire 712, electrically connected respectively to a first connection conducting wire 711 and a second connection conducting wire 712 constituting another main body 61 (omitted from the illustration).

Figure 11:
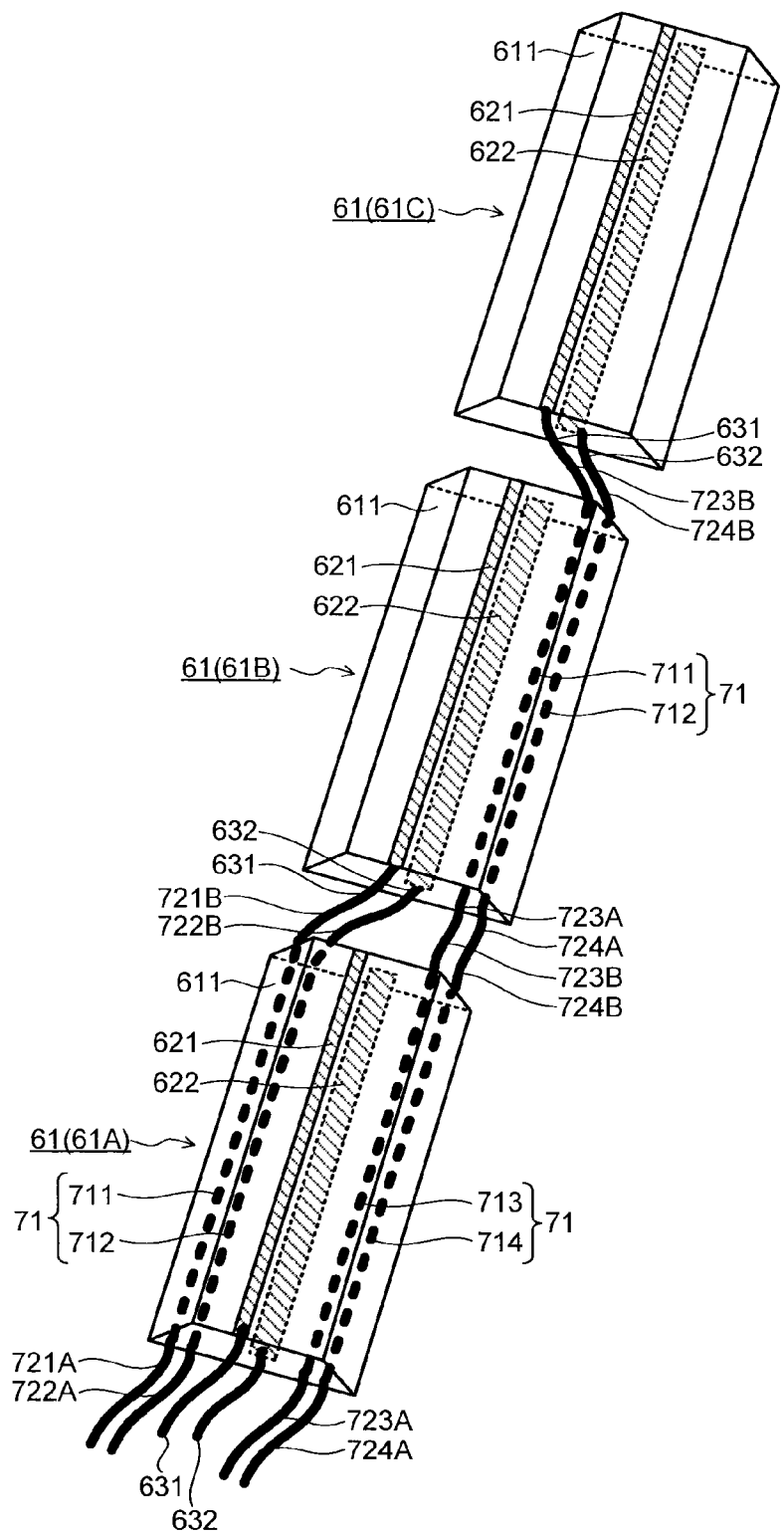
FIG. 11 is a view illustrating an appearance of main bodies of airflow generation devices when disposed on a windmill blade in the wind power generation system according to the fourth embodiment.

FIG. 11 is a view illustrating an appearance of main bodies 61 of airflow generation devices 6 when disposed on a windmill blade 42 (see FIG. 2) in the wind power generation system according to the fourth embodiment.

As illustrated in FIG. 11, among the plurality of main bodies 61, in the first main body 61A, the first to fourth connection conducting wires 711 to 714 are provided as the connection conducting wire 71 inside the base 611. In the main body 61B, the first and second connection conducting wires 711, 712 are provided as the connection conducting wire 71 inside the base 611.

The first connection conducting wire 711 and the second connection conducting wire 712 provided in the first main body 61A are electrically connected respectively to a first electrode 621 and a second electrode 622 provided in a second main body 61B. The third connection conducting wire 713 and the fourth connection conducting wire 714 provided in the first main body 61A are electrically connected respectively to a first connection conducting wire 711 and a second connection conducting wire 712 provided in the second main body 61B.

The first connection conducting wire 711 and the second connection conducting wire 712 provided in the second main body 61B are electrically connected respectively to a first electrode 621 and a second electrode 622 provided in a third main body 61C.

Thus, both the first connection conducting wire 711 and the second connection conducting wire 712 provided in the first main body 61A are used for connecting the second main body 61B to the voltage application unit 62 in parallel with the first main body 61A. Further, both the third connection conducting wire 713 and the fourth connection conducting wire 714 provided in the first main body 61A and both the first connection conducting wire 711 and the second connection conducting wire 712 provided in the second main body 61B are used for connecting the third main body 61C to the voltage application unit 62 in parallel with the first main body 61A and the second main body 61B.

[B] Summary

As described above, in this embodiment, the main body 61 of the airflow generation device 6 is formed, similarly to the case of the first embodiment, to gradually decrease in thickness from the center portion to the end portions (see FIG. 9, FIG. 10A, FIG. 10B). Thus, in this embodiment, when the main body 61 of the airflow generation device 6 is disposed on the surface of the windmill blade 42 (see FIG. 1, FIG. 2), a large step is not formed due to the main body 61. As a result, disturbance of flow around the windmill blade 42 due to the step can be suppressed, and thus power generation output can be made stable.

Further, in this embodiment, the connection conducting wire 71 is provided inside the base 611 in the main body 61 of the airflow generation device 6 (see FIG. 9, FIG. 10A, FIG. 10B). Here, the plurality of connection conducting wires 71 (711 to 714) are provided inside the base 611 in one main body 61 (for example, the first main body 61A). Then, the plurality of connection conducting wires 71 (711, 712) provided in the one main body 61 (for example, the first main body 61A) are electrically connected respectively to the first electrode 621 and the second electrode 622 provided in another main body 61 (for example, the second main body 61B) (see FIG. 10A, FIG. 10B).

Thus, in this embodiment, when the plurality of main bodies 61 are disposed side by side on the windmill blade 42, a step due to the connection conducting wire 71 decreases, and thus disturbance of flow around the windmill blade 42 can be prevented and the power generation output can be made stable.

[C] Modification Example

Regarding the connection conducting wires 71 in the main body 61 of an airflow generation device 6, preferably bare wires, on which there is no coating and a conductor is exposed, are prepared as the connection conducting wires 71, and the base 611 is formed to enclose the bare wires. In this case, the thickness of the main body 61 can be made smaller than in the case where coated wires are prepared as the connection conducting wires 71 to form the main body 61.

<Others>

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wind power generation system, comprising:
an airflow generation device comprising: a main body having a base formed of an insulating material, the base provided with a first electrode and a second electrode; and a voltage application unit generating an airflow on a surface of the main body by applying voltage between the first electrode and the second electrode, wherein, in the main body, a connection conducting wire is provided inside the base; and
windmill blades on which the main body of the airflow generation device is disposed,
wherein a plurality of main bodies are provided as the main body of the airflow generation device, the plurality of main bodies being laid side by side in a blade span direction of the windmill blades;
wherein a plurality of connection conducting wires are provided inside the base in one main body among the plurality of main bodies; and
wherein the first electrode and the second electrode provided in another main body among the plurality of main bodies are electrically connected respectively to the plurality of connection conducting wires provided in the one main body.

2. The wind power generation system according to claim 1,
wherein the main body of the airflow generation device is disposed in a portion on a leading edge side on a surface on a blade back side of the windmill blade.

3. The wind power generation system according to claim 1, further comprising:
a tower;
a nacelle disposed on an upper end portion of the tower; and
a rotor rotatably supported on a side end portion of the nacelle with the windmill blades being attached to a hub.

4. The airflow generation device according to claim 1, wherein the base is formed of a resin.

5. The airflow generation device according to claim 1, wherein the main body has a trapezoidal cross section.

* * * * *